May 3, 1966
J. C. KELLY
3,249,317
SCRAP COILER
Filed April 10, 1964
6 Sheets-Sheet 1
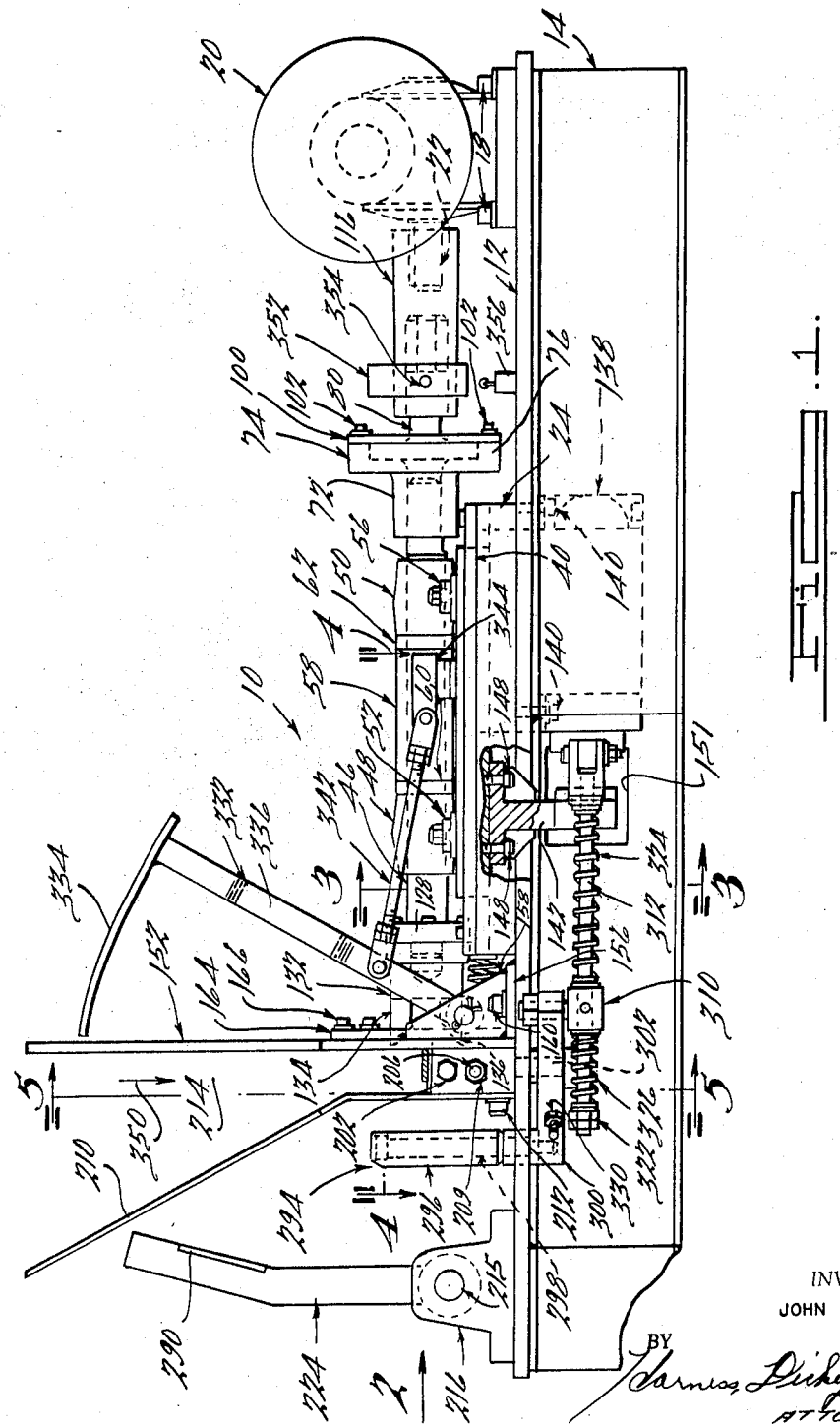
INVENTOR.
JOHN C. KELLY
BY
ATTORNEYS

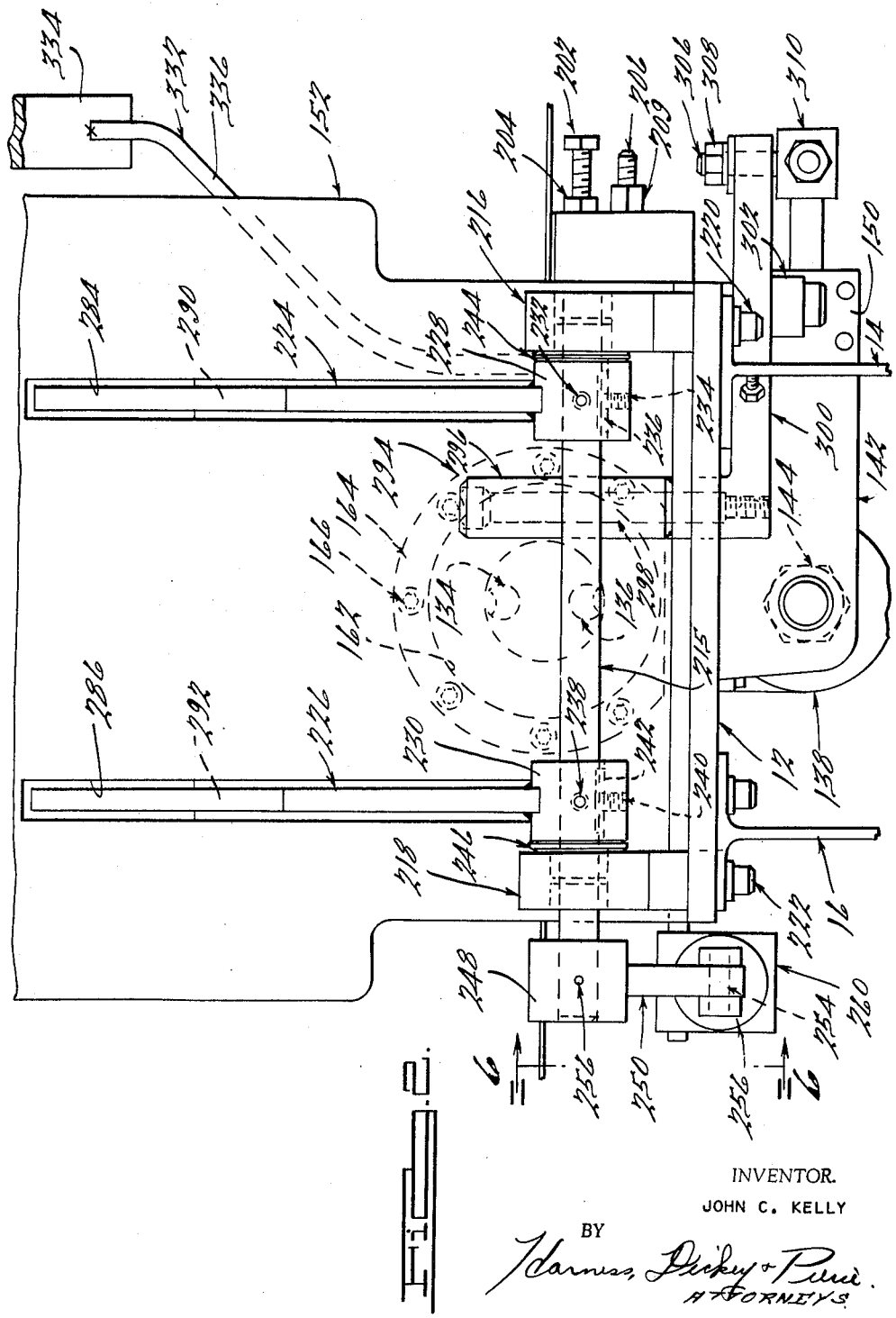

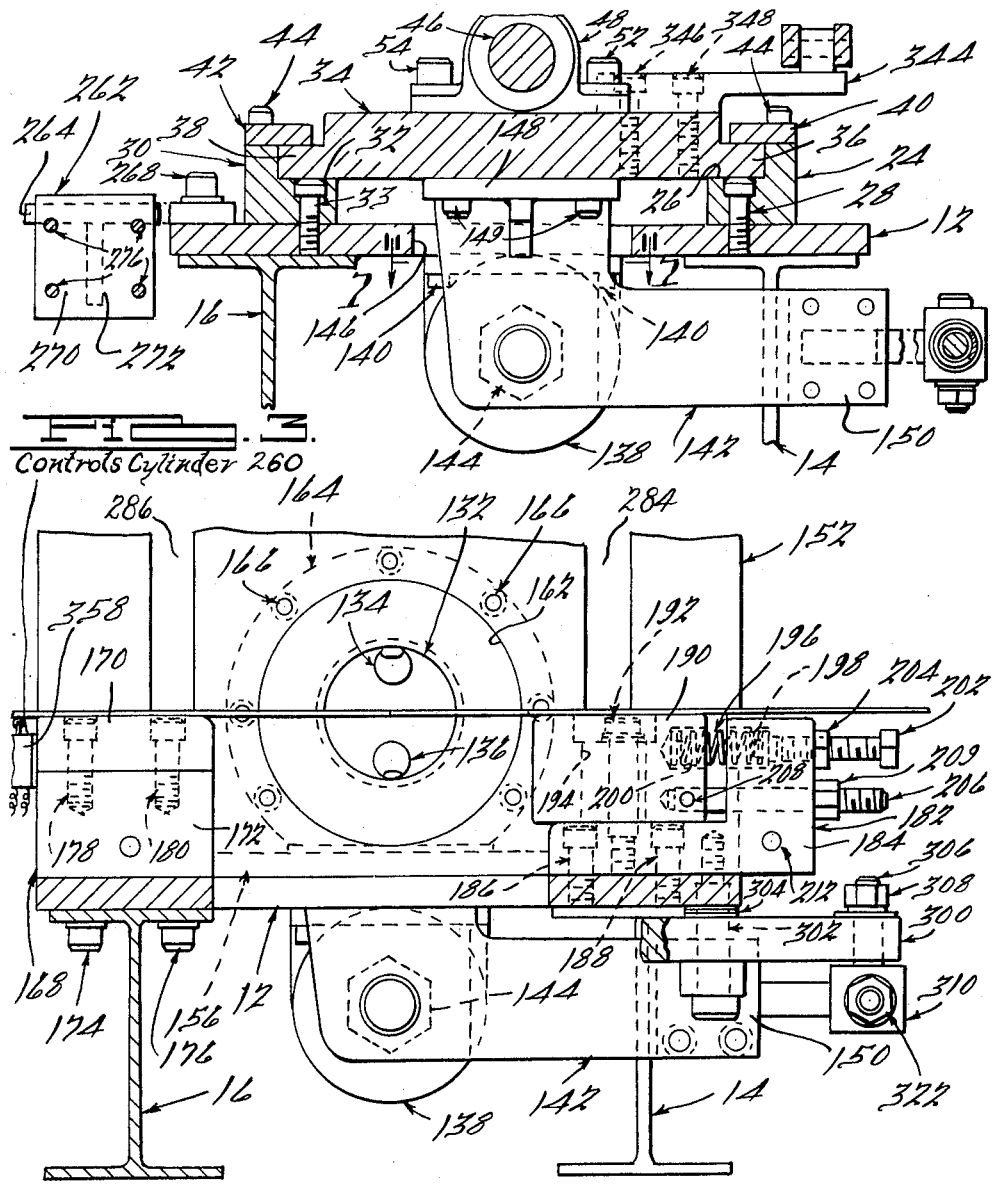

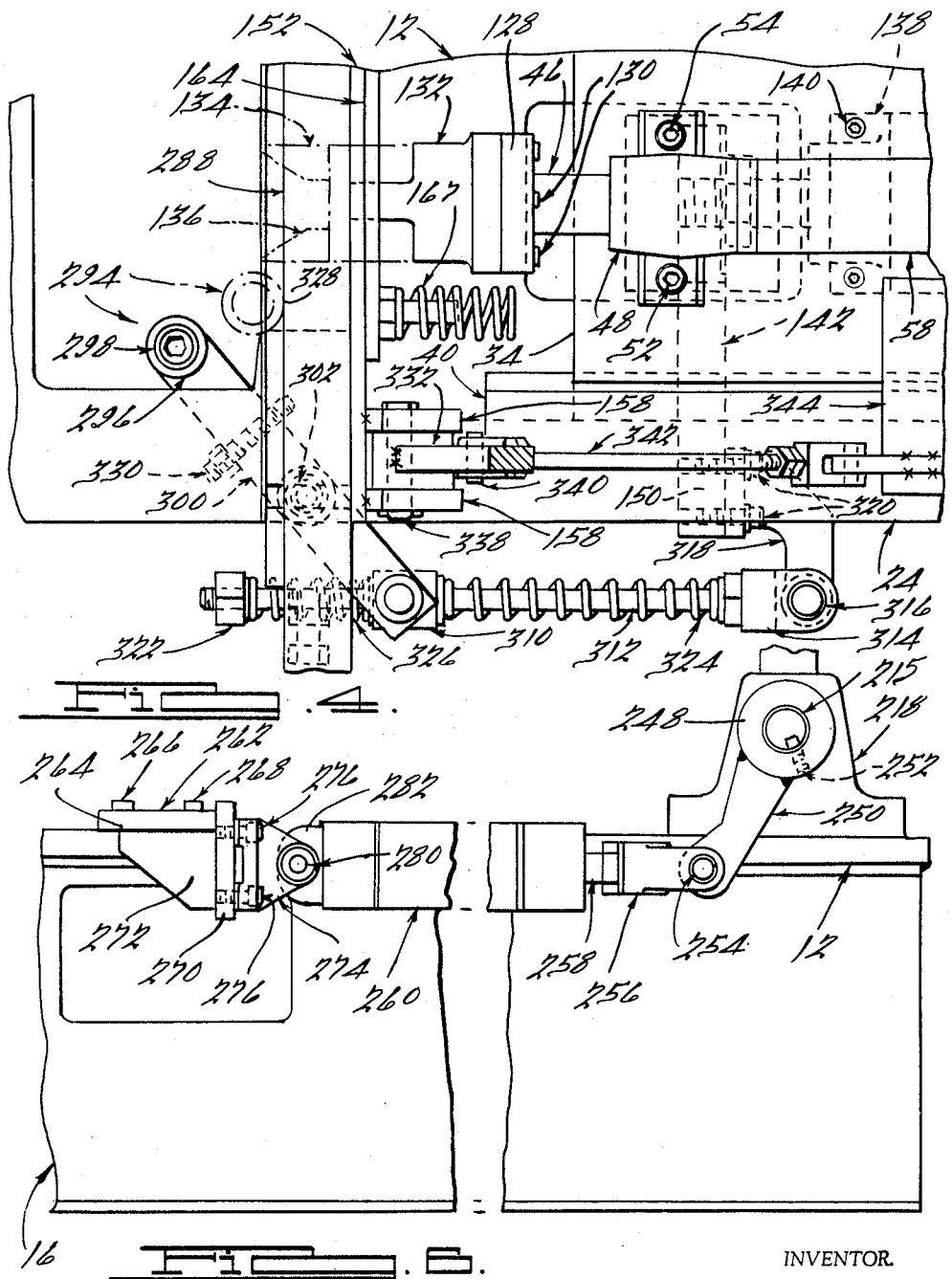

May 3, 1966     J. C. KELLY     3,249,317
SCRAP COILER
Filed April 10, 1964     6 Sheets-Sheet 5
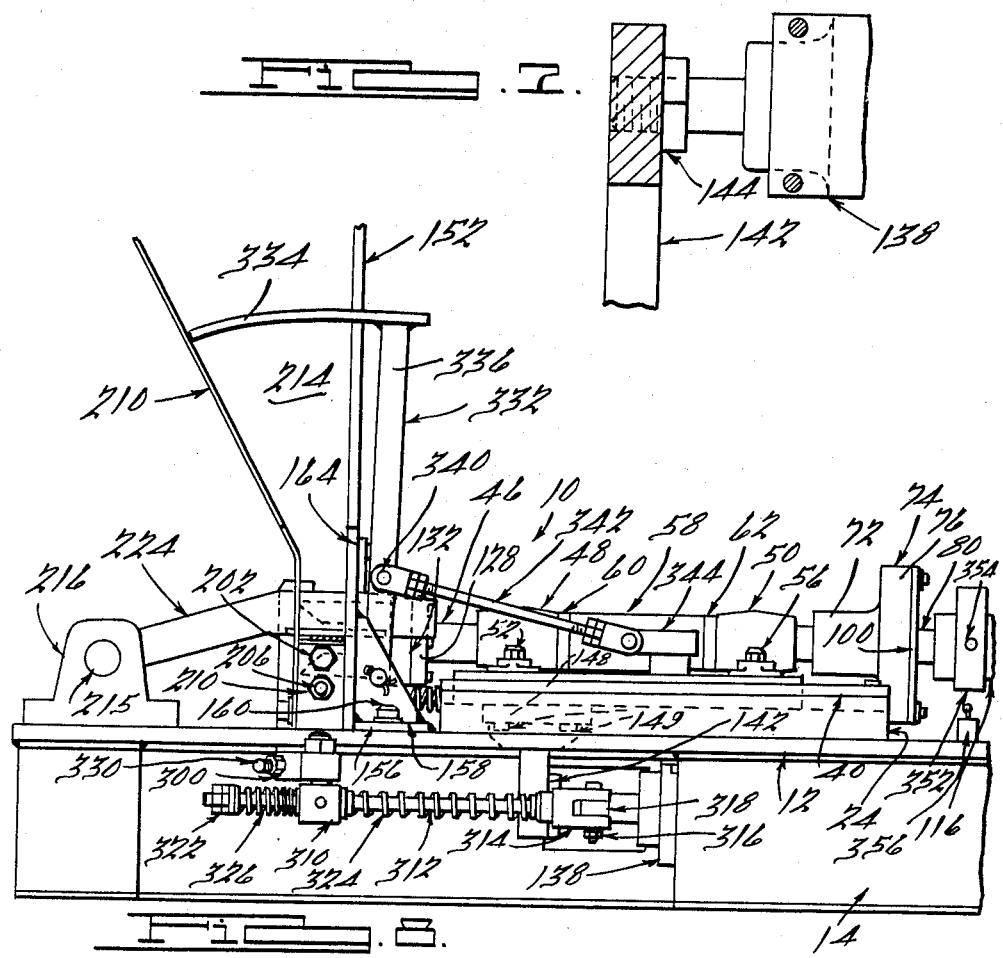
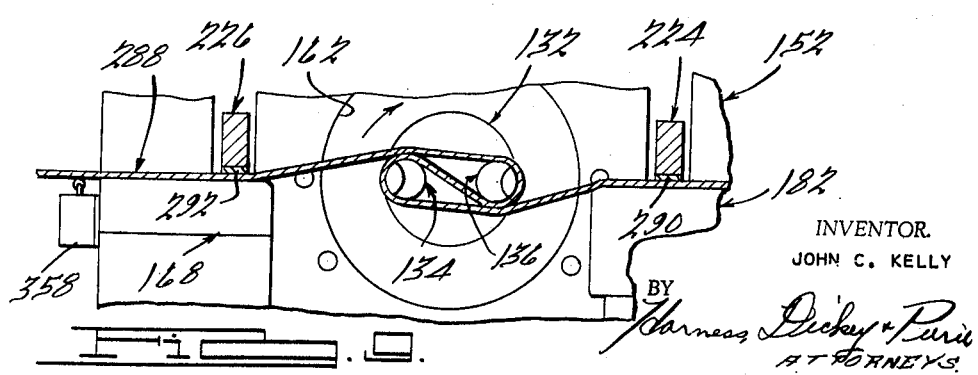
INVENTOR.
JOHN C. KELLY May 3, 1966
J. C. KELLY
3,249,317
SCRAP COILER
Filed April 10, 1964
6 Sheets-Sheet 6
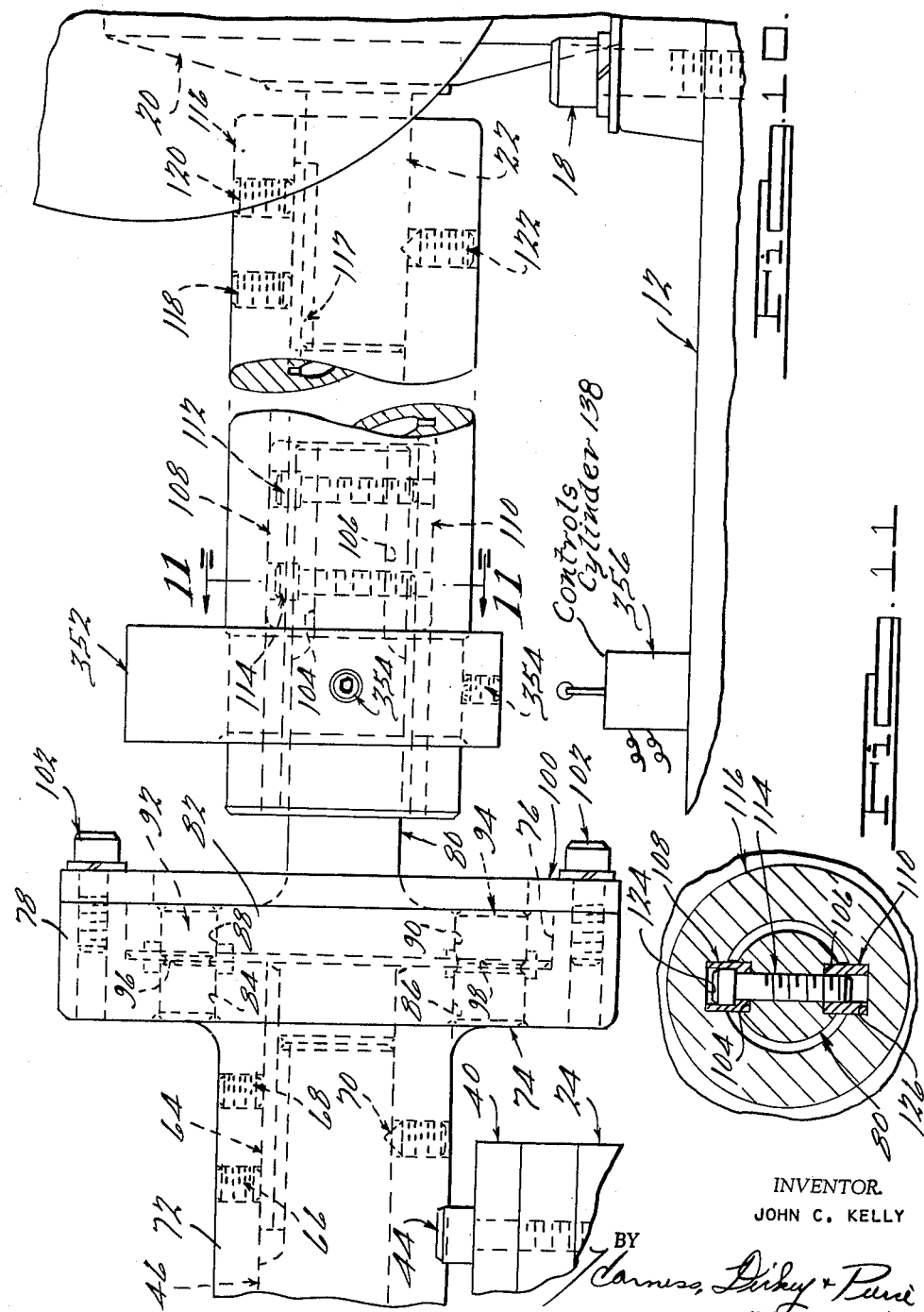
INVENTOR.
JOHN C. KELLY
BY
ATTORNEYS United States Patent Office 3,249,317
Patented May 3, 1966

3,249,317
SCRAP COILER
John C. Kelly, Jackson, Mich., assignor to Kelsey-Hayes Company, Romulus, Mich., a corporation of Delaware
Filed Apr. 10, 1964, Ser. No. 362,550
18 Claims. (Cl. 242—78.1)

This invention relates generally to means for disposing of scrap metal, and more particularly, to a device which operates automatically to wind elongated scrap metal strips into compact, easy-to-handle coils.

The scrap coiler of the present invention is characterized by a device which is adapted to receive strip metal stock directly from a shearing or similar type sheet metal cutting machine and engage the stock with a pair of bifurcated tangs mounted on the end of a continually rotating and axially movable shaft. As the shaft rotates, the strip stock is tightly wound about the outer periphery of the tangs, and upon completion of the coiling operation, the shaft automatically retracts, thereby ejecting the strip stock in an easily disposable coiled condition.

It is an object of the present invention to provide a scrap coiler of the above character which is smooth in operation and which is adapted to coil relatively long scrap strips in a comparatively short period of time.

It is another object of the present invention to provide a scrap coiler of the above character which winds strip stock in substantially flat or coplanar coils.

It is still another object of the present invention to provide a scrap coiler whose operation is entirely automatic.

It is yet another object of the present invention to provide a scrap coiler of the above character which is provided with safety means adapted to prevent strip stock from dropping into the device during the actual coiling operation thereof.

Other objects and advantages of the present invention will become apparent from the following detailed description taken in conjunction with the accompanying drawings wherein:

FIGURE 1 is a side elevational view, partially broken away, of an exemplary embodiment of the scrap coiler of the present invention;

FIGURE 2 is a fragmentary side end elevational view of the structure illustrated in FIGURE 1, taken in the direction of the arrow 2 thereof;

FIGURE 3 is a fragmentary cross-sectional view taken substantially along the line 3—3 of FIGURE 1;

FIGURE 4 is a fragmentary top elevational view of the structure illustrated in FIGURE 1, taken substantially along the line 4—4 thereof;

FIGURE 5 is a fragmentary cross-sectional view taken along the line 5—5 of FIGURE 1;

FIGURE 6 is a side elevational view of a portion of the structure illustrated in FIGURE 2, taken along the line 6—6 thereof;

FIGURE 7 is a fragmentary cross-sectional view taken along the line 7—7 of FIGURE 3;

FIGURE 8 is a side elevational view of the structure illustrated in FIGURE 1, as seen during the operation thereof;

FIGURE 9 is a fragmentary side elevational view illustrating the configuration of a strip of scrap stock, during the operation of the structure illustrated in FIGURE 1;

FIGURE 10 is an enlarged fragmentary view of a portion of the structure illustrated in FIGURE 1; and FIGURE 11 is a transverse cross-sectional view taken along the line 11—11 of FIGURE 10.

Referring now to the drawings, a scrap coiler 10, in accordance with an exemplary embodiment of the present invention, includes a flat elongated base plate 12 which is supported upon and rigidly secured by welding in two spaced parallel base rails 14 and 16, each of which is generally I-shaped in transverse section. Mounted on one end of the base plate 12 by a plurality of bolts, generally designated 18, is an electric motor 20 whose output shaft 22 extends parallel to the longitudinal axis of the scrap coiler 10.

As best seen in FIGURES 1 and 3, a longitudinally extending slidway 24, having a generally horizontal bearing surface 26, is mounted on the base plate 12 directly over the base rail 14. A plurality of longitudinally spaced bolts, generally designated 28, extend through the slideway 24 and into the base plate 12 to rigidly secure the slideway 24 thereto. A similar slideway 30, having a horizontal bearing surface 32, is mounted on the base plate 12 directly over the base rail 16 by a plurality of bolts 33. It will be seen that the slideways 24 and 30 are arranged in a parallel spaced confronting relationship.

A flat carriage plate 34, having reduced thickness longitudinal edge portions 36 and 38, extends between and is slidably mounted on the bearing surfaces 26 and 32 of the slideways 24 and 30. A pair of retainer plates 40 and 42 are coextensive with the slideways 24 and 30 and are respectively secured to the uppermost surfaces thereof by a plurality of bolts, generally designated 44. As seen in FIGURE 3, the retainer plates 40 and 42 extend laterally from the slideways 24 and 30 and at least partially overlie the carriage plate edge portions 36 and 38, thereby permitting relative sliding movement between the plate 34 and the slideways 24, 30 but precluding any relative vertical movement therebetween.

Referring to FIGURE 1, a longitudinally extending shaft 46 is rotatably mounted on the top of the carriage plate 34 by a pair of longitudinally spaced shaft support members or bearing housings 48 and 50. Suitable anti-friction means, for example, roller bearings or the like, are provided in each of the housings 48 and 50 to permit relatively free rotation of the shaft 46 therein. Bolts 52 and 54 extend through suitable apertures in the base of the housing 48 and into the carriage plate 34 to rigidly secure the housing 48 thereto. Similar bolts, one of which is illustrated and designated by the numeral 56, extend through the base of the housing 50 into the carriage plate 34 to support the housing 50 thereon. An annular spacer or sleeve 58 is disposed circumjacent a medial section of the shaft 46 inbetween the shaft support housings 48 and 50. A pair of thrust rings or washers 60 and 62 are respectively disposed one interjacent the sleeve 58 and the housing 48, and the other interjacent the sleeve 58 and the housing 50. The sleeve 58 is keyed or similarly secured to the shaft 46 and upon a longitudinal or sliding movement of the carriage plate 34 in the slideways 24 and 30, the rings 60 or 62 will be engaged by the adjacent of the support housings 48 or 50 to effect a longitudinal or axial movement of the shaft 46.

As best seen in FIGURES 1 and 10, the end of the shaft 46 extending longitudinally outward from the support housing 50 is rigidly secured, as by a key 64 and a plurality of set screws 66, 68 and 70, to a collar section 72 of an annular shear pin housing 74. Together with the collar section 72, the housing 74 is formed with an enlarged diameter cup section 76 which is provided with an outer peripheral annular wall 78. A longitudinally extending shaft 80, which is coaxial with the shaft 46 and on which is integrally formed a radially outwardly extending, annular shoulder portion 82, extends axially outward from the housing 74 with its shoulder portion 82 disposed or nested within the housing's cup section 76. The housing 74 is formed with a pair of axially extending and diametrically opposed bores 84 and 86 which are adapted to register or align with similar bores 88 and 90 formed in the shoulder portion 82 of the shaft 80. A pair of shear pins 92 and 94, which are respectively provided with reduced diameter medial sections 96 and 98, extend longitudinally through the aligned bores 84, 88 and 86, 90, thereby operatively connecting the shaft 80 to the housing 74, which, as previously described is secured to the shaft 46. The shear pins 92 and 94 are designed to transmit the rotational movement of one of the shafts 46, 80 to the other of said shafts until such time as one of the shafts resists the rotational movement of the other by a predetermined force, whereby the pins 92 and 94 will shear at their respective medial sections 96 and 98 and permit relatively free rotational movement between the shafts 46 and 80. A ring-shaped retaining plate 100 is mounted around the shear pin housing's outer peripheral wall portion 78 by a plurality of circumferentially spaced bolts, generally designated 102. The plate 100 extends radially inwardly over the outer periphery of the shoulder portion 82 of the shaft 80 and is thereby adapted to preclude any relative axial movement between the housing 74 and the shaft 80, and thus maintain the shoulder portion 82 within the cup section 76 in the event the pins 92 and 94 become sheared.

As illustrated in FIGURE 10, the outer end of the shaft 80 is formed with a pair of radially inwardly extending, diametrically opposed recesses 104 and 106 within which respective keyways 108 and 110 are secured by diametrically extending bolts 112 and 114. The shaft 80 is rotatably connected to the output shaft 22 of the motor 20 by an annular coupling 116 which is coaxial with each of the shafts 80 and 22. A keyway 117, together with a plurality of set screws 118, 120 and 122, which extend radially inwardly within suitable bores in the coupling 116, lockingly secure the shaft 22 within the coupling 116. As best seen in FIGURE 11, the end of the coupling 116, opposite that which is secured to the motor shaft 22, is formed with a pair of diametrically opposed recesses 124 and 126 which are adapted to slidably receive the keyways 108 and 110 upon assembly of the outer end of the shaft 80 within the coupling 116. It will be noted that there is provided sufficient clearance between the sides of the recesses 124 and 126 and the sides of the keyways 108 and 110 so as to permit relatively free sliding movement therebetween. It will also be noted that rotary movement may be transmitted from the motor's output shaft 22, through the coupling 116, to the shaft 80 concurrent with limited axial movement of the shaft 80 with respect to the coupling 116.

Referring now to FIGURE 4, and specifically to the shaft 46, it will be seen that a radially outwardly extending flange portion 128 is integrally formed on the end of the shaft 46. Supported on the outer side of the flange portion 128 by a plurality of longitudinally extending bolts 130 is a cylindrical tool holder or chuck 132. A pair of diametrically opposed, longitudinally extending strip coiling fingers or tangs 134 and 136 are detachably supported in the end of the chuck 132 by suitable set screws (not shown). The tangs 134 and 136 have reduced sized outer ends which are adapted to selectively engage elongated strips of scrap metal to effect the coiling thereof, in a manner hereinafter to be described.

From the structure thus described, it will be seen that rotation of the output shaft 22 will, through the coupling 116, the shafts 80 and 46, the shear pin housing 74 and the chuck 132, effect the rotation of the tangs 134 and 136. At such time as the tangs 134 and 136 exert a predetermined force resisting rotation by the motor 20, the pins 92 and 94 will shear, thereby preventing damage to the motor 20. Also, as the carriage plate 34 is biased longitudinally within the slideways 24 and 30, the shaft support housings 48 or 50 engage the rings 60 and 62, thereby biasing the shafts 46 and 80, shear pin housings 74, chuck 132, and tangs 134 and 136 longitudinally with the plate 34. Thus, it will be seen that by reciprocating the plate 34 in the slideways 24 and 30, it is possible to selectively reciprocate the tangs 134 and 136 into and out of engagement with successive strips of scrap metal while the tangs are continually rotating.

Referring now to FIGURES 1, 3 and 5, a hydraulically actuated piston and cylinder assembly, generally designated 138, is mounted by a plurality of bolts 140 to the lower side of the base plate 12 interjacent the base rails 14 and 16. A transversely extending and generally L-shaped arm 142 is threaded on the reciprocal piston of the assembly 138 and is secured thereon by a locknut 144, as seen in FIGURE 7. As illustrated in FIGURE 3, the base plate 12 is formed with a central opening 146 through which an upper section 148 of the arm 142 extends and is connected by a plurality of bolts 149 to the lower side of the carriage plate 34. The arm 142 is also formed wth an outwardly extending section 150 which extends laterally outward through an opening 151 in the base rail 14. Upon appropriate actuation of the piston and cylinder assembly 138, the arm 142 will be reciprocated in a longitudinal direction, and by virtue of the fact that the arm's upper section 148 is attached to the carriage plate 34, the plate 34 will also be reciprocated in the slideways 24 and 30, thereby effecting the afore-discussed reciprocal movement of the shaft 46 and the tangs 134 and 136.

As best seen in FIGURES 1 and 2, a transversely and upwardly extending strip guide plate 152 is mounted on the top of the base plate 12 in the approximate radial plane of the tangs 134 and 136. The lower end of the plate 152 is secured as by welding to a laterally extending fastening plate 156 and to a plurality of transversely spaced, triangularly shaped reinforcing members, one of which is illustrated in FIGURE 1 and is generally designated 158. A plurality of bolts 160 rigidly secure the fastening plate 156, and hence the plate 152, to the base plate 12. The guide plate 152 is formed with a central annular opening 162 around which a reinforcing ring 164 is mounted by a plurality of circumferentially spaced bolts 166, and through which the tangs 134 and 136 extend and rotate during the strip coiling operation. A bumper or cushioning spring assembly 167 is mounted on the lower end of the plate 152 and is adapted to resiliently engage the arm 142 upon actuation of the piston and cylinder assembly 138.

Referring again to FIGURE 5, mounted directly above the base rail 16 adjacent the lower end of the plate 152 is a workpiece or strip supporting member 168 which consists of upper and lower sections 170 and 172. The support member's lower section 172 is secured to the top of the base plate 12 by bolts 174 and 176, and the upper section 170 is detachably connected to the section 172 by bolts 178 and 180. Mounted directly above the base rail 14 and in the same transverse plane as the support member 168 is another strip support member 182. The member 182 includes a base section 184, the lower end of which is attached to the base plate 12 by bolts 186 and 188. The support member 182 also includes an upper section 190 which is slidably secured to the base section 184 by a bolt 192 which extends vertically within a laterally elongated slot 194 in the support member's upper section 190 and is screwed into the top of the base section 184. A helical coil spring 196 extends between coaxial bores 198 and 200 respectively formed in the support member sections 184 and 190. An adjustment bolt 202 having a locking nut 204 extends through the spring 196 and is adjustably mounted in section 184. It will be apparent that appropriate rotation of the bolt 202 will effect the lateral resilient force exerted on the section 190 by the coil spring 196. By virtue of the elongated configuration of the slot 194, the support member upper section 190 may, to a limited degree, move laterally with respect to the base section 84 to effect the compactness of the strip coils formed around the tangs 134 and 136, as will be described. A cylindrical shaft 206, which is attached to the section 190 by a pin 208, extends laterally through the base section 184 and has a nut 209 threaded on the outer end thereof, which nut may be adjusted on the shaft 206 to vary the amount of lateral movement of the section 190 with respect to the section 184.

A pair of laterally spaced elongated strip guides, one of which is illustrated in FIGURE 1 and designated by the numeral 210, extend upwardly from the top of the base plate 12. The guide 210 is secured at its lower end to the base section 184 of the strip support member 182 by a bolt 212. The other strip guide (not shown) is similarly supported at its lower end on the lower section 172 of the strip support member 168. Preferably, the strip guides extend vertically upward from the support members 168 and 182 to a position somewhat above the horizontal plane defined by the uppermost surfaces of the support members 168 and 182, at which point the guides are offset or inclined away from the lateral plate of the plane 152 an angle of approximately 30°. It will be seen in FIGURE 1 that the strip guides and plate 152 define a transversely extending trough or opening, generally designated 214, within which elongated scrap strips are dropped or inserted into the assembly 10.

Referring again to FIGURES 1 and 2, on the end of the base plate 12 opposite the motor 20, there is provided a transversely extending cylindrical shaft 215 which is rotatably mounted in a pair of laterally spaced shaft support housings 216 and 218. The housings 216 and 218 are provided with suitable antifriction bearings to permit relatively free rotation of the shaft 215 therewithin, and are respectively secured to the top of the base plate 12 by bolts 220 and 222. A pair of strip constraining arms, generally designated 224 and 226 and which are respectively provided with hollow sleeve sections 228 and 230, are mounted on the shaft 215 laterally inwardly from the shaft support housings 216 and 218. Set screws 232 and 234, and a keyway 236 are provided in the sleeve section 228 and function to prevent any relative axial movement between the arm 224 and the shaft 215. Similarly, set screws 238 and 240 and a keyway 242 are provided in the sleeve section 230 to lockingly secure the arm 226 to the shaft 215. A pair of thrust bearings 244 and 246 are provided one between the sleeve section 228 and the housing 216 and the other between the sleeve section 230 and the housing 218.

It will be seen in FIGURES 2 and 6 that the shaft 215 extends laterally outward from the support housing 218 and is secured within a sleeve section 248 which is formed on one end of an actuating or pivot link 250 by a set screw 252. The opposite end of the link 250 is pivotally connected by a pin 254 to a bifurcated fitting 256 which is disposed on the end of a reciprocating piston 258 of a piston and cylinder assembly, generally designated 260. As seen in FIGURE 6, the assembly 260 is pivotally supported on the end of the base plate 12 by a bracket, generally designated 262, which includes an upper plate 264 through which bolts 266 and 268 extend to secure the bracket 262 to the base plate 12. The bracket 262 further includes a laterally extending end plate 270 and a triangularly shaped reinforcing plate 272. A yoke 274 is attached by a plurality of bolts, generally designated 276, to the end plate 270 and is pivotally connected by a pin 280 to an end section 282 of the assembly 260.

Upon actuation of the assembly 260, the piston 258 will move longitudinally outwardly thereby rotating or pivoting the link 250 about the axis of the shaft 215 and accordingly effecting rotation of the shaft 215 and the constraining arms 224 and 226. As seen in FIGURE 2, the plate 152 is formed with a pair of generally rectangularly shaped, elongated openings 284 and 286 through which the outer or swinging ends of the arms 224 and 226 extend as they are rotated upon the shaft 215 to the position illustrated in FIGURE 8. In this position, the arms 224 and 226 are adapted to yieldably maintain the outer ends of a scrap strip, representatively illustrated herein by the strip 288, against the upper surfaces of the support members 168 and 182, as best seen in FIGURE 9. Thus, it will be apparent that as the strip 288 is being coiled around the tangs 134 and 136, the arms 224 and 226 prevent the outer ends of the strip 288 from indiscriminately rotating upon rotation of the shaft 46, thereby assuring that the strip will be wound into as compact a coil as possible.

It may be noted that to prevent undue wear of the strip engaging surfaces, generally designated 290 and 292, on the arms 224 and 226, these surfaces are preferably surface hardened by any conventional heat treating technique. Alternatively, wear-resistant, removable plates fabricated of a suitable material such as a high carbon alloy steel may be secured to the strip engaging portions of each of the arms 224 and 226.

In order to assure that during the strip coiling operation the adjacent convolutions of the coiled strips are wound in a general coplanar relationship, there is provided a roller assembly, generally designated 294, which is adapted to engage and force a section of the strip being coiled against the lower end of the plate 152. Thus, as the strip is being coiled around the tangs 134 and 136, each successive convolution is confined within a lateral plane determined by the roller assembly 294 and the plate 152 and thus the strip in its coiled condition will be substantially flat about its central axis.

Referring to FIGURE 2, it will be seen that the roller assembly 294 includes a roller 296 rotatably mounted on a cylindrical spindle 298 which extends vertically upward from and is mounted on the inner end of an elongated pivot arm 300. As seen in FIGURE 5, the arm 300 is pivotally mounted by a bolt 302 to the lower side of the base plate 12 at a position underlying the strip support member 182. A thrust washer 304 is provided interjacent the base plate 12 and the arm 300 to permit relatively free pivotal movement therebetween.

The outer end of the arm 300 is pivotally connected by a bolt 306 and nut 308 to an annular sleeve 310 which is slidably mounted on a longitudinally extending shaft 312. As seen in FIGURES 4 and 8, threaded on one end of the shaft 312 is a fitting 314 which is pivotally connected by a pivot pin 316 to a shaft support member 318 extending laterally outward from and being attached by a plurality of bolts 320 to the end section 150 of the arm 142. Extending coaxial of the shaft 312 between the fitting 314 and the sleeve 310, and between the sleeve 310 and a nut 322 threaded on the end of the shaft 312, are coil springs 324 and 326, respectively.

It will be seen that as the arm 142 is longitudinally reciprocated by the piston and cylinder assembly 138, the shaft 312 will be correspondingly reciprocated, and by virtue of the coil spring 324, the sleeve 310 will be biased longitudinally on the shaft 312, thus pivoting the arm 300. When the arm 300 is pivoted, the roller 296 is biased to the position illustrated by the phantom lines in FIGURE 4, and engages the strip 288, as at 328. As the strip 288 becomes coiled, it is maintained between the plate 152 and the roller 296, thus providing the previously described flat or coplanar coil. A pivot stop in the form of a bolt 330 extends inwardly from the arm 300 and is adapted to engage the plate 152 to limit the pivotal movement of the arm 300 and roller assembly 296.

Referring now to FIGURES 1 and 8, an inverted L-shaped arm, generally designated 332 and consisting of an arcuate upper section 334 and an upwardly extending lower section 336, is pivotably mounted at the bottom of its lower section 336 by a pivot pin 338 (see FIG. 4) which extends laterally through the section 336 and through suitable apertures in a pair of the reinforcing plates 158 supporting the plate 152 on the base plate 12. Pivotably attached to a medial portion of the arm's lower section 336 by a pin 340 is a shaft 342 which extends from and is pivotably connected at its lower end to a bracket 344 secured by bolts 346 and 348 (see FIG. 3) to the top of the carriage plate 34.

The arm 332 is normally oriented in the position illustrated in FIGURE 1, thereby permitting scrap strips to drop into the transverse opening 214 in the direction of the arrow 350. However, upon forward movement of the carriage plate 34 through actuation of the piston and cylinder assembly 138, the shaft 342 pivots the arm 332 to the position illustrated in FIGURE 8. In this position, the arcuate upper section 334 of the arm 332 extends longitudinally across the opening 214 thereby preventing scrap strips from dropping into the opening while the immediately preceding strip is being coiled about the rotating tangs 134 and 136. Thus, it will be seen that the arm 332 acts as a safety means to preclude scrap strips from inadvertently dropping into the opening 214 during the coiling operation of the device 10.

As best seen in FIGURE 10, an eccentric cam 352 is mounted circumjacent the coupling 116 and is rigidly secured thereto by locking screws 354. Upon rotation of the coupling 116, the cam 352 is adapted to selectively engage and actuate a limit switch 356 which is mounted on the upper surface of the base plate 12 in the radial plane of the cam 352. Another limit switch 358 is mounted on the outer side of the strip support member 168 in a position such that each scrap strip dropping into the opening 214 will actuate the switch 358 and maintain it in an actuated condition until such time as substantially the entire strip becomes coiled. The limit switches 356 and 358 are connected to a motor control (not shown) which is adapted to effect the energization and deenergization of the piston and cylinder assemblies 138 and 260, as will be described.

To facilitate correlating the various components of the scrap coiler 10 as hereinbefore specifically described, a brief resume of the operation of the assembly will now be given.

In operation, the motor 20 is normally operating thereby rotating the shafts 80 and 46, the chuck 132 and the tangs 134 and 136. The piston and cylinder assembly 138 is in its retracted position thereby orienting the carriage plate 34, the shafts 80 and 46, and the tangs 134 and 136 in their respective positions illustrated in FIGURE 1. It will also be seen in FIGURE 1 that the arms 224 and 226, and the arm 332 are in their respective open positions permitting scrap strips to drop vertically downward in the transverse opening 214 defined by the strip guide 210 and another guide not shown, and the guide plate 152.

At such time as a scrap strip is ejected from the sheet metal cutting or shearing machine, the strip will drop downward within the opening 214 to the position illustrated in FIGURE 5, wherein the strip bears upon the strip support members 168 and 182. As the strip drops downward within the opening 214, it engages and actuates the limit switch 358 which in turn effects, through the motor control, the energizaiton or actuation of the piston and cylinder assembly 260. With the assembly 260 thus actuated, the piston 258 is forced longitudinally outward thereby rotating the shaft 215 and causing the constraining arms 224 and 226 to be pivoted about the shaft 215 to the position illustrated in FIGURES 8 and 9 whereby the sections 290 and 292 of the arms 224 and 226 yieldably maintain the outer ends of the strip against the upper surfaces of the strip support members 168 and 182.

The aforementioned motor control, by virtue of the switch 356 and cam 352, registers the radial position of the tangs 134 and 136, and is accordingly adapted to energize or actuate the piston and cylinder assembly 138 to effect the longitudinal movement and subsequent engagement of the tangs 134 and 136 with the scrap strip when the radial angularity of the tangs 134 and 136 is such that at the precise moment the tangs 134 and 136 move forward through the opening 162 in the plate 152, the tangs 134 and 136 will "straddle" the scrap strip, as seen in FIGURE 5.

Concomitant with the forward movement of the tangs 134 and 136 into engagement with the scrap strip upon actuation of the assembly 138, the roller assembly 294 is pivoted about the pin 302 into the position illustrated in FIGURE 4, thereby maintaining the scrap strip against the lower end of the plate 152. Also occurring simultaneously with the forward movement of the tangs 134 and 136 is the pivoting of the arm 332 to the closed position as illustrated in FIGURE 8. As previously described, the arm 332 when disposed in its closed position prevents additional scrap strips from dropping downward into the transverse opening 214 during the coiling operation of the immediately preceding strip.

As best seen in FIGURE 9, upon rotation of the shaft 46, the scrap strip, herein designated 288, becomes coiled about the outer periphery of the tangs 134 and 136. It will be apparent that as the strip becomes coiled, the outer ends of the strip 288 move laterally inward toward the tangs 134 and 136 and as the outer end of the strip 288 overlying the strip support member 168 moves laterally inward, it will release the limit switch 358 thereby deenergizing the piston and cylinder assembly 138 to effect retraction of the arm 142. Upon retraction of the arm 142, the carriage plate 34 will move rearward in the slideways 24 and 30 thereby pivoting roller assembly 294 to the position illustrated in FIGURE 1. Release of the limit switch 358 will also effect the retraction of the piston and cylinder assembly 260 whereby the arms 224 and 226 will be pivoted upwardly from the support members 168 and 182 to the position illustrated in FIGURE 1. As the assembly 138 is deenergized, the tangs 134 and 136 will be correspondingly retracted. By virtue of the fact that the strip 288 in its coiled condition extends radially outwardly from the opening 162 in the plate 152, as the tangs 134 and 136 are retracted, the coiled strip will be forced axially off the tangs 134 and 136 by the plate 152. The coiled strip then drops vertically downward between the base rails 14 and 16 into a suitable receptacle below the coiler 10. With the arms 224 and 226, and the arm 332 in their respective open position, the coiler 10 is again conditioned to receive another scrap strip, the dropping of which will effect the identical operation herein described.

It may be noted that the upper section 190 of the strip support members 182 may be adjusted to resiliently bear against the outer periphery of the scrap strips in their coiled condition, thereby forcing the outer ends of the strips against the coils prior to their being removed from the tangs 134 and 136. Thus, it will be apparent that as the coiled strips are ejected from the device 10, the individual coils will be entirely devoid of any outwardly projecting end sections of the coiled strips.

While it will be apparent that the exemplary embodiment herein illustrated is well calculated to fulfill the objects stated, it will be appreciated that the scrap coiler of the present invention is susceptible to modification, variation and change without departing from the proper scope or fair meaning of subjoined claims.

What is claimed is:
1. In a device for coiling strip material,
means defining a support structure,
shaft means extending longitudinally of said structure,
means on said structure for effecting rotation of said shaft,
means on said structure adapted to releasably maintain a strip material on said structure, and
means for engaging said strip material interjacent said last mentioned means to effect the coiling of said material, and
means including said shaft means for moving said last mentioned means toward and away from a strip disposed on said support structure.

2. In a device for coiling strip material,
means defining a support structure,
a rotatable shaft extending longitudinally of said base,
a medial portion of said structure being longitudinally movable with respect to the opposite ends of said base,
means on one end of said structure for effecting rotative movement of said shaft,
means on said medial portion of said structure for effecting axial movement of said shaft,
support means on one end of said structure for receiving and operatively supporting the strip material,
means for yieldably maintaining a portion of said strip material on said support means, and
means extending axially from one end of said shaft for engaging said strip material to effect the coiling thereof.

3. A device for coiling strip material as set forth in claim 2 which includes guide means extending upwardly from said structure and being adapted to position said strip material on said support means.

4. A device for coiling strip material as set forth in claim 2 which includes a pair of laterally spaced strip guides and a transversely extending guide plate extending upwardly from the opposite sides of said support means and being adapted to position said strip material on said support means.

5. A device for coiling strip material as set forth in claim 2 which includes roller means engageable with said strip material to effect a substantially coplanar coiling thereof.

6. A device for coiling strip material as set forth in claim 2 wherein said rotative movement of at least a portion of said shaft will automatically stop when a preselected force resists rotation of said shaft.

7. A strip coiling machine which includes the combination of, a flat elongated base plate,
slideway means extending longitudinally of said base plate,
carriage means slidable in said sideway means,
a rotatable shaft mounted on said carriage means and extending longitudinally of said base plate,
means on said base plate for effecting longitudinal movement of said carriage means and said shaft,
means on said base plate for effecting rotative movement of said shaft,
coupling means rotatably connecting said shaft to said means for effecting rotatable movement of said shaft,
means for receiving and operatively maintaining the strip material on said base, and
means on said shaft for engaging said strip material while said shaft is rotating to effect the coiling of said material.

8. A strip coiling machine which includes the combination of, base plate means,
a pair of laterally spaced slideways extending longitudinally of said base plate,
carriage means slidable in said slideways,
a rotatable shaft mounted on said carriage means and extending longitudinally of said base plate,
means on said base plate for effecting longitudinal movement of said carriage means and said shaft,
means on said base plate for effecting rotative movement of said shaft,
coupling means rotatably connecting said shaft to said means for effecting rotatable movement of said shaft,
support means on one end of said base for receiving and operatively supporting the strip material,
pivotal means movable to and from the position yieldably maintaining a portion of said strip material on said support means, and
means extending axially from one end of said shaft for engaging said strip material interjacent said pivotal means to effect the coiling of said material.

9. A strip coiling machine which includes the combination of,
a flat elongated base plate,
a pair of laterally spaced slideways extending longitudinally of said base plate,
carriage means slidable in said slideways,
a rotatable shaft mounted on said carriage means and extending longitudinally of said base plate,
means on said base plate for effecting longitudinal movement of said carriage means and said shaft,
means on said base plate for effecting rotative movement of said shaft,
coupling means rotatably connecting said shaft to said means for effecting rotatable movement of said shaft,
a pair of laterally spaced strip support members on one end of said base plate,
a pair of elongated strip guides and a transversely extending guide plate extending upwardly from said base plate on the opposite sides of said strip support members, and
a pair of laterally spaced strip retaining arms pivotably mounted on said base plate and being movable to and from a position yieldably maintaining the strip material on said strip support members.

10. A strip coiling machine as set forth in claim 9 wherein one end of said shaft is bifurcated and is movable to and from a position extending through an opening in said guide plate to selectively engage said strip material.

11. A strip coiling machine which includes the combination of,
a flat elongated base plate,
a pair of laterally spaced slideways extending longitudinally of said base plate,
a carriage plate slidable in said slideways,
a rotatable shaft mounted on said carriage plate and extending longitudinally of said base plate,
means on said base plate for effecting longitudinal movement of said carriage plate and said shaft,
means on said base plate for effecting rotative movement of said shaft,
coupling means rotatably connecting said shaft to said means for effecting rotatable movement of said shaft,
roller means movable to and from a position engaging the strip material upon longitudinal movement of said carriage plate,
means for receiving and operatively maintaining said strip material on said base, and
means on said shaft for engaging said strip material while said shaft is rotating to effect the coiling of said material.

12. A strip coiling machine which includes the combination of,
a flat elongated base plate,
slideway means extending longitudinally of said base plate,
a carriage plate slidable in said slideway means,
a rotatable shaft mounted on said carriage means and extending longitudinally of said base plate, means on said base plate for effecting longitudinal movement of said carriage plate and said shaft,
means on said base plate for effecting rotative movement of said shaft,
coupling means rotatably connecting said shaft to said means for effecting rotatable movement of said shaft,
means on said base plate movable to and from a position preventing strip material from entering the machine during the coiling operation thereof,
means for receiving and operatively maintaining the strip material on said base, and
means on said shaft for engaging said strip material while said shaft is rotating to effect the coiling of said material.

13. In combination with a sheet metal cutting machine, a flat elongated base plate,
a pair of laterally spaced slideways extending longitudinally of said base plate,
a carriage plate slidable in said slideways,
a rotatable shaft mounted on said carriage plate and extending longitudinally of said base plate,
means on said base plate for effecting longitudinal movement of said carriage plate and said shaft,
means on said base plate for effecting rotative movement of said shaft,
coupling means rotatably connecting said shaft to said means for effecting rotatable movement of said shaft,
means for receiving and operatively maintaining the strip material on said base,
said shaft being provided with toolholding means on one end thereof,
said toolholding means detachably supporting a pair of longitudinally extending tangs operable to selectively engage said strip material to effect the coiling thereof.

14. In a scrap coiler,
an elongated base,
a first rotatable shaft extending longitudinally of said base,
a toolholding chuck on one end of said first rotatable shaft detachably supporting a pair of diametrically opposed, axially extending strip engaging tangs,
a cup-shaped shear pin housing on the opposite end of said first rotatable shaft,
a second rotatable shaft coaxial with said first rotatable shaft,
said second rotatable shaft having an annular shoulder disposed within said shear pin housing and being rotatably connected to said housing by a plurality of shear pins,
means for effecting rotative movement of said first and second shafts, and
an annular coupling extending between said means for effecting rotative movement and said second rotatable shaft,
said second rotatable shaft being axially movable within said coupling concurrent with the rotation of said coupling and said second rotatable shaft.

15. In a scrap coiler,
an elongated flat base plate,
a first rotatable shaft extending longitudinally of said base plate,
a pair of strip support members disposed one on each side of said shaft,
a pair of strip guides and a transversely extending guide plate extending upwardly from said base plate on the opposite sides of said support members,
a second rotatable shaft extending transverseley of said base plate,
means on said base plate for effecting rotation of said second rotatable shaft, and
a pair of strip retaining arms on said second rotatable shaft being movable to and from a position yieldably maintaining a scrap strip on said strip support members.

16. In a scrap coiler,
an elongated flat base plate,
a first rotatable shaft extending longitudinally of said base plate,
a pair of laterally spaced slideways extending longitudinally of said base plate,
a carriage plate longitudinally slidable in said slideways,
a rotatable shaft mounted on said carriage plate and extending longitudinally of said base plate,
means on said base plate for effecting rotative movement of said shaft,
piston and cylinder means on said base plate operable to effect longitudinal movement of said carriage plate and said shaft,
a pair of laterally spaced strip support members on said base plate,
a pair of strip guides and a transversely extending guide plate on said base plate and defining a transverse opening through which the strip material may drop,
means on said base plate pivotable to and from a position yieldably maintaining the strip material on said supporting means,
roller means pivotable upon actuation upon said piston and cylinder means to and from a position at least partially defining a plane transverse to the longitudinal axis of said base plate and within which the strip material is coiled, and
means pivotably mounted on said base plate and being movable to and from a position closing said transverse opening upon actuation of said piston and cylinder means.

17. In a scrap coiler,
means defining a support structure,
slideway means on said structure,
a flat carriage plate longitudinally movable in said slideway means,
a first piston and cylinder means mounted on said structure and operable to selectively reciprocate said carriage plate in said slideway means,
a first rotatable shaft mounted on said carriage plate,
a second rotatable shaft coaxial with said first shaft and being mounted on said structure,
a motor on said structure having an output shaft coaxial with said second shaft,
a rotatable coupling rigidly secured to said output shaft and being slidably connected to said second shaft,
a pair of strip support members disposed one on each side of said first shaft,
an elongated upwardly extending strip guide secured to each of said support members,
a transversely extending guide plate secured to said structure adjacent said support members,
a third rotatable shaft extending transversely of said structure,
a pair of laterally spaced strip constraining arms on said third shaft movable to and from a position engaging said support members,
a second piston and cylinder means on said structure for effecting movement of said arms,
a vertically extending roller operatively connected to said carriage plate and being movable to and from a position engaging the strip material being coiled upon reciprocation of said carriage plate,
an upwardly extending safety arm pivotally mounted on said structure,
said arm being movable to and from a position overlying at least a portion of said strip material being coiled upon reciprocation of said carriage plate,
said first rotatable shaft being provided with a pair of strip engaging tangs which are movable with said first shaft to and from a position engaging strip material which is disposed on said support members, and means for independently actuating said first and second piston and cylinder assemblies.

18. A scrap coiler as set forth in claim 17 wherein said means for effecting actuation of said piston and cylinder assemblies consists of first and second independently actuable limit switches one of which is engageable with the strip material being coiled and another of which is engageable with a cam means on one of said shafts.

References Cited by the Examiner

UNITED STATES PATENTS

| | | | |
|---|---|---|---|
| 2,157,900 | 5/1939 | Hopkins | 242—61 |
| 2,756,941 | 7/1956 | Ranney | 242—78.1 |

STANLEY N. GILREATH, *Primary Examiner.*

MERVIN STEIN, *Examiner.*

N. L. MINTZ, *Assistant Examiner.*